United States Patent
Buzzard et al.

(10) Patent No.: US 12,351,249 B1
(45) Date of Patent: Jul. 8, 2025

(54) STEER-BY-WIRE ROTATIONAL TRAVEL STOP

(71) Applicant: Steering Solutions IP Holding Corporation, Saginaw, MI (US)

(72) Inventors: Donald A. Buzzard, Saginaw, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/599,382

(22) Filed: Mar. 8, 2024

(51) Int. Cl.
*B62D 5/04* (2006.01)
*B62D 5/00* (2006.01)

(52) U.S. Cl.
CPC ........... *B62D 5/001* (2013.01); *B62D 5/0448* (2013.01)

(58) Field of Classification Search
CPC .................................................. B62D 5/0448
See application file for complete search history.

(56) References Cited

U.S. PATENT DOCUMENTS

| | | | | |
|---|---|---|---|---|
| 844,469 A * | 2/1907 | Prouty | ................. | E21B 19/081 254/DIG. 8 |
| 2,356,861 A * | 8/1944 | Link | ..................... | B63H 25/28 74/89.37 |
| 2,417,434 A * | 3/1947 | Mead | .................. | F16H 25/2015 74/89.37 |
| 2,791,129 A * | 5/1957 | Russell | ............... | F16H 25/2015 74/424.71 |
| 3,202,008 A * | 8/1965 | Geyer | ................. | F16H 25/2015 74/89.37 |
| 5,088,339 A * | 2/1992 | Lochmoeller | ....... | F16H 25/2015 74/89.37 |
| 5,461,935 A * | 10/1995 | Hill | ..................... | F16H 25/2015 74/89.37 |
| 5,704,249 A * | 1/1998 | Krauska | ................. | F16H 25/24 74/89.37 |
| 8,800,402 B2 * | 8/2014 | Weum | ................. | E05B 47/0012 74/424.78 |
| 9,103,422 B2 * | 8/2015 | Wingett | ............. | F16H 25/2204 |
| 9,731,681 B2 * | 8/2017 | Behrens | ................. | B60R 25/02 |

(Continued)

FOREIGN PATENT DOCUMENTS

| | | | | |
|---|---|---|---|---|
| CN | 107953925 B | * | 4/2021 | ............... B62D 1/16 |
| CN | 219257473 U | * | 6/2023 | |

(Continued)

*Primary Examiner* — Nicole T Verley
(74) *Attorney, Agent, or Firm* — Dickinson Wright PLLC

(57) ABSTRACT

A travel stop assembly for a vehicle steer-by-wire steering system includes a shaft defining a spiral track extending from a first track end to a second track end. The travel stop assembly also includes a nut extending radially from an inner radial surface to an outer radial surface, the nut extending circumferentially from a first circumferential end to a second circumferential end, wherein the inner radial surface is disposed within the spiral track, wherein the nut is rotationally fixed such that rotation of the shaft axially translates the nut along the spiral track, wherein the first track end, the second track end, the first circumferential end and the second circumferential end are positioned to limit the axial movement of the nut and rotation of the shaft to a predetermined axial distance of the nut and a predetermined rotational angle of the shaft.

14 Claims, 10 Drawing Sheets

(56) References Cited

U.S. PATENT DOCUMENTS

| | | |
|---|---|---|
| 10,160,477 B2 | 12/2018 | Bodtker et al. |
| 10,239,552 B2 * | 3/2019 | Bodtker ................ B62D 5/001 |
| 10,837,530 B2 * | 11/2020 | Tilloy ................ F16H 25/2015 |
| 11,204,082 B2 * | 12/2021 | Bonkowski ............ B62D 5/001 |
| 11,746,862 B2 * | 9/2023 | Sommerfeld ....... F16H 25/2015 |
| | | 74/89.37 |
| 2016/0355207 A1 * | 12/2016 | Urushibata .............. B62D 1/16 |
| 2017/0369091 A1 * | 12/2017 | Nash ..................... B62D 1/185 |
| 2018/0029632 A1 * | 2/2018 | Bodtker ................ B62D 5/001 |
| 2018/0238377 A1 * | 8/2018 | Kim ........................ B62D 6/10 |
| 2020/0102000 A1 * | 4/2020 | Wawrzyniec ............ B62D 3/12 |

FOREIGN PATENT DOCUMENTS

| | | | | |
|---|---|---|---|---|
| DE | 4038808 C2 * | 3/1999 | ............. | B62D 6/10 |
| EP | 2058210 B1 * | 8/2012 | ............. | B62D 1/16 |
| GB | 2628431 A * | 9/2024 | ............ | B62D 5/001 |
| JP | 2000016316 A * | 1/2000 | | |
| JP | 4783352 B2 * | 9/2011 | ............. | B62D 1/16 |
| WO | WO-2011135849 A1 * | 11/2011 | ............. | F16H 25/20 |

\* cited by examiner

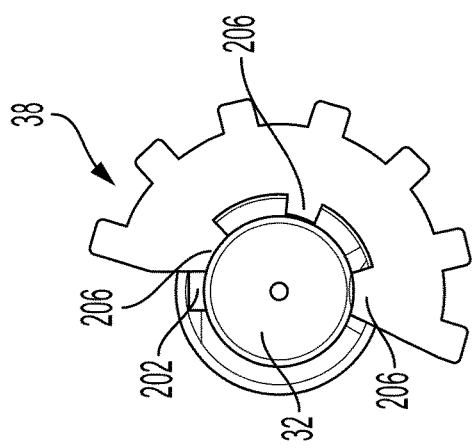
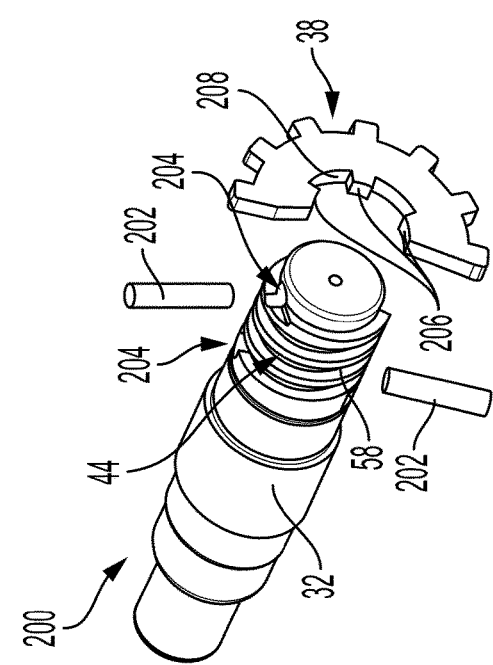
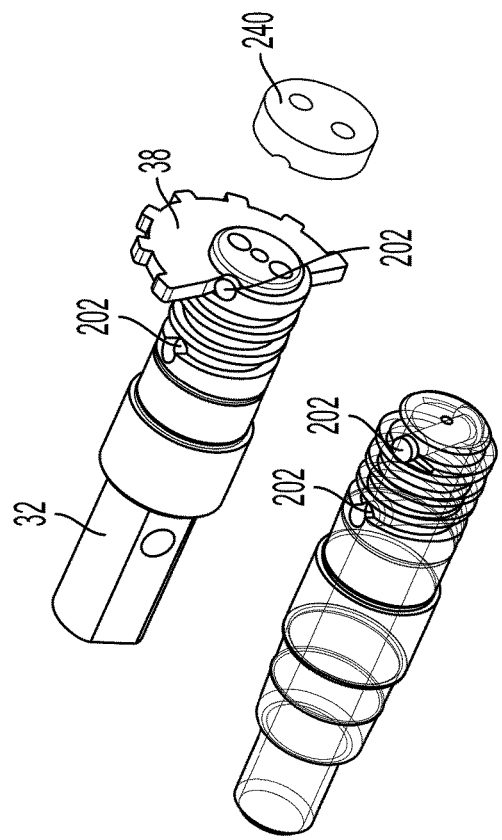

STEER-BY-WIRE ROTATIONAL TRAVEL STOP

FIELD OF THE INVENTION

The disclosure generally relates to vehicle steering systems and, more particularly, to a steer-by-wire rotational travel stop.

BACKGROUND

As vehicle technology advances, handwheel actuators and roadwheel actuators are being employed more frequently to control travel of a vehicle and to replace direct mechanical linkages between the steering wheel and tires of a vehicle. During travel of the vehicle, the handwheel actuator and roadwheel actuator cooperate with each another, through electrical communication (e.g., wires, sensors, and a central processing unit), to directionally control travel of the vehicle. More specifically, sensed movement of the respective handwheel and/or tires is electrically communicated to the respective handwheel actuator or roadwheel actuator to cause movement of the handwheel and/or tires. However, such advancement in vehicle technology, and the complexity in the same, present unique challenges. For example, direct mechanical linkage between the handwheel and tires limit rotation of the handwheel, which may prevent damage to components of the handwheel/steering column assembly or may simply be used to limit a travel range of the handwheel/steering column.

A handwheel coupled to a handwheel actuator is subject to over-rotation as there is no mechanical linkage/component limiting rotation. In turn, components such as a clock spring, an air bag coil, etc., of the handwheel actuator are subject to damage due to over-rotation of the handwheel.

SUMMARY

According to one aspect of the disclosure, a travel stop assembly for a vehicle steer-by-wire steering system includes a shaft extending along an axis and being rotatable about the axis, the shaft defining a spiral track extending from a first track end to a second track end. The travel stop assembly also includes a nut extending radially from an inner radial surface to an outer radial surface, the nut extending circumferentially from a first circumferential end to a second circumferential end, wherein the inner radial surface is disposed within the spiral track, wherein the nut is rotationally fixed such that rotation of the shaft axially translates the nut along the spiral track, wherein the first track end, the second track end, the first circumferential end and the second circumferential end are positioned to limit the axial movement of the nut and rotation of the shaft to a predetermined axial distance of the nut and a predetermined rotational angle of the shaft, respectively, based on contact between the first circumferential end and the first track end, as well as contact between the second circumferential end and the second track end.

According to another aspect of the disclosure, a steer-by-wire vehicle steering system includes a steering shaft configured to be rotated during steering maneuvers of a vehicle. The steering system also includes a handwheel actuator operatively coupled to the steering shaft. The steering system further includes a shaft operatively coupled to the steering shaft or integrally formed with the steering shaft, the shaft limited to a predetermined rotational angle with a travel stop assembly. The travel stop assembly includes a spiral track defined along an axial portion of the shaft, the spiral track extending from a first track end to a second track end. The travel stop assembly also includes a nut extending radially from an inner radial surface to an outer radial surface, the nut extending circumferentially from a first circumferential end to a second circumferential end, wherein the inner radial surface is disposed within the spiral track. The travel stop assembly further includes a housing radially surrounding the nut, wherein the outer radial surface of the nut includes a radially extending tab disposed within an axially extending groove defined by the inner surface of the housing to rotationally fix the nut. The nut is rotationally fixed such that rotation of the shaft axially translates the nut along the spiral track, wherein the first track end, the second track end, the first circumferential end and the second circumferential end are positioned to limit the axial movement of the nut and rotation of the shaft to a predetermined axial distance of the nut and a predetermined rotational angle of the shaft, respectively, based on contact between the first circumferential end and the first track end, as well as contact between the second circumferential end and the second track end.

According to another aspect of the disclosure, a travel stop assembly for a steer-by-wire vehicle steering system includes a shaft extending along an axis and being rotatable about the axis, the shaft defining a spiral track extending from a first track end to a second track end. The travel stop assembly also includes a nut extending radially from an inner radial surface to an outer radial surface, the nut extending circumferentially from a first circumferential end to a second circumferential end, wherein the inner radial surface is disposed within the spiral track. The travel stop assembly further includes a housing radially surrounding the nut, wherein the outer radial surface of the nut includes a radially extending tab disposed within an axially extending groove defined by the inner surface of the housing to rotationally fix the nut, wherein the nut is rotationally fixed such that rotation of the shaft axially translates the nut along the spiral track, wherein the first track end, the second track end, the first circumferential end and the second circumferential end are positioned to limit the axial movement of the nut and rotation of the shaft to a predetermined axial distance of the nut and a predetermined rotational angle of the shaft, respectively, based on contact between the first circumferential end and the first track end, as well as contact between the second circumferential end and the second track end. The travel stop assembly yet further includes a recirculating ball circuit disposed between the nut and the spiral track.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features and advantages of the present disclosure are apparent from the following detailed description taken in conjunction with the accompanying drawings.

FIG. 13 is a perspective, disassembled view of the rotational stop assembly according to another aspect of the disclosure;

FIG. 14 is an end view of the rotational stop assembly of FIG. 13;

FIG. 15 is a perspective view of the rotational stop assembly of FIG. 13;

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
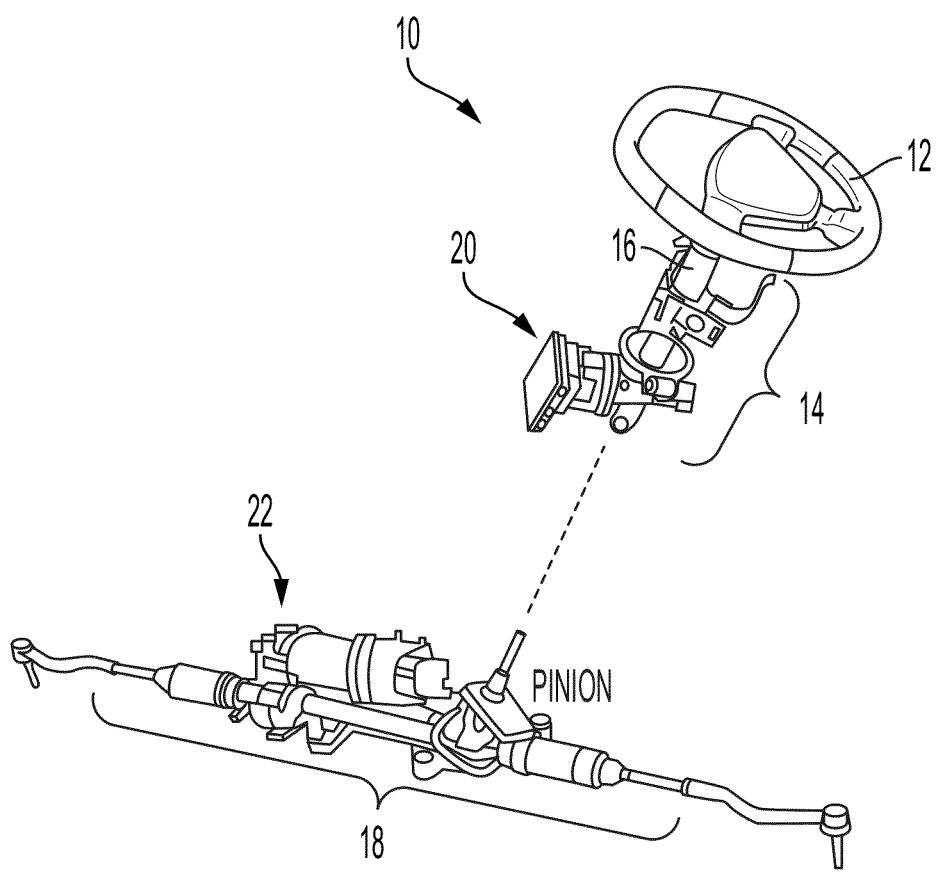
FIG. 1 generally illustrates a steering system.

Referring initially to FIG. 1, vehicles such as cars, trucks, sport utility vehicles, crossovers, mini-vans, marine craft, aircraft, all-terrain vehicles, recreational vehicles, or other suitable vehicles, include a steering system. The steering system disclosed herein is referred to generally with numeral 10 and is a steer-by-wire steering system. The steering system 10 includes a handwheel 12 for a user to grasp and rotate to provide steering input commands to execute vehicle steering maneuvers. The handwheel 12 is operatively coupled to a steering column assembly 14. The steering column assembly 14 houses a steering shaft 16 which rotates with the handwheel 12. The steering shaft 16 and the steering column assembly 14 extend from proximate the handwheel 12. Steer-by-wire steering systems typically include one or more controllers which control various aspects of the steering system including, but not limited to, controlling one or more electric motors and/or one or more actuators of the steering system. The steer-by-wire steering system 10 does not include a continuous mechanical coupling between the handwheel 12 and a steering rack 18. The steer-by-wire steering system 10 includes a handwheel actuator 20 and a roadwheel actuator 22, as is generally illustrated.

As disclosed above, the steering system 10 does not include a continuous mechanical connection between the handwheel 12 and the steering rack 18. Based on the disclosed configuration of the steering system 10, the embodiments disclosed herein provide an assembly that defines rotational limits of the steering shaft 16 and, therefore, the handwheel 12.

Figure 2:
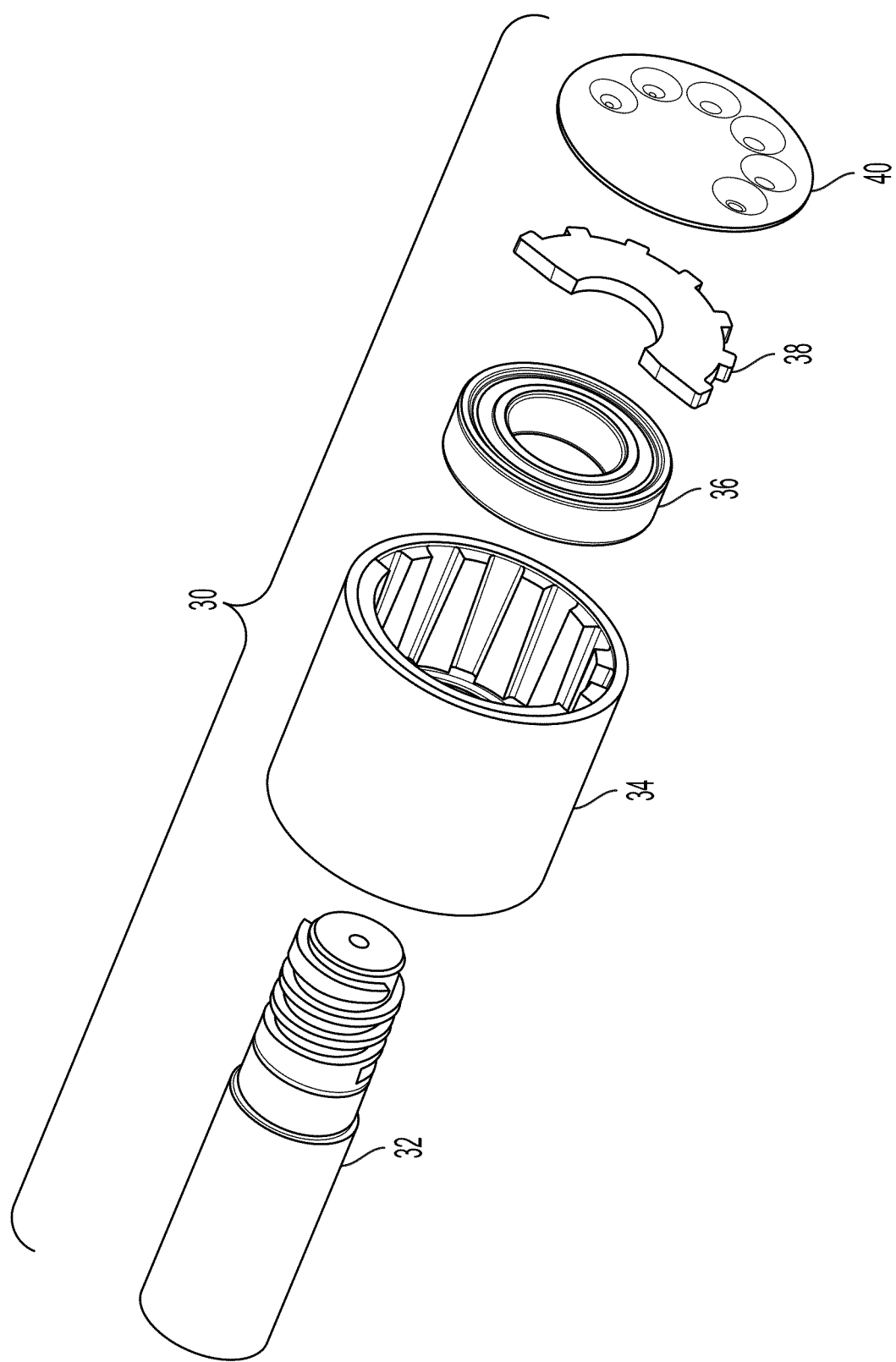
FIG. 2 is a perspective, disassembled view of a rotational stop assembly for the steering system.
Figure 3:
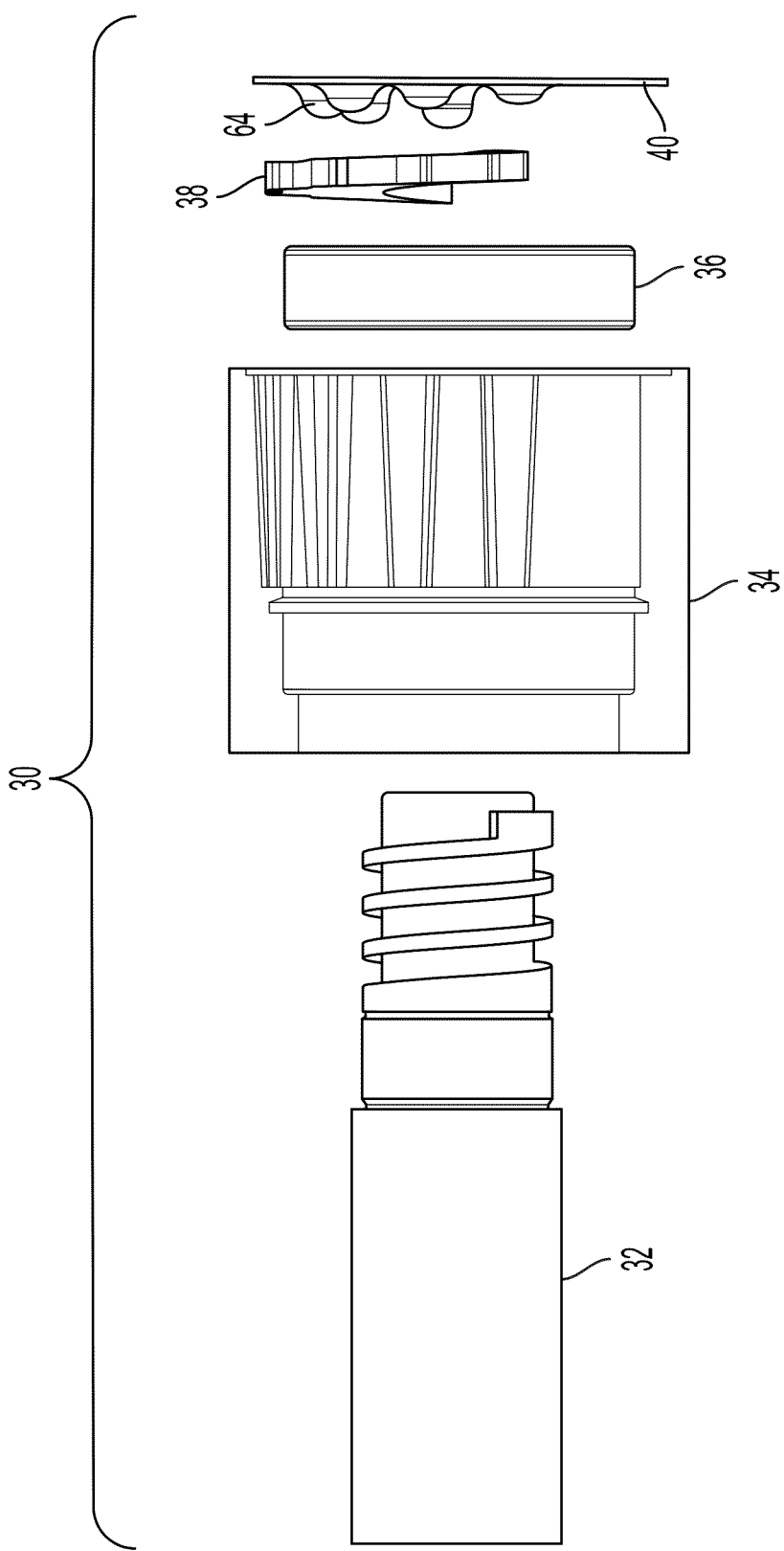
FIG. 3 is an elevation, disassembled view of the rotational stop assembly.

Referring now to FIGS. 2 and 3, a travel stop assembly 30 is shown in a disassembled condition. The travel stop assembly 30 includes a shaft 32 which is operatively coupled to the steering shaft 16. The term "operatively coupled", as used herein, defines direct or indirect coupling of components. Alternatively, the shaft 32 may be integrally formed with the steering shaft 16 in some embodiments. Regardless of the particular connection with the steering shaft 16, the shaft 32 rotates about an axis A in a corresponding manner with the steering shaft 16 as the handwheel 12 is rotated. In addition to the shaft 32, the travel stop assembly also includes a housing 34, a bearing 36, a nut 38 and an end cover 40.

Figure 5:
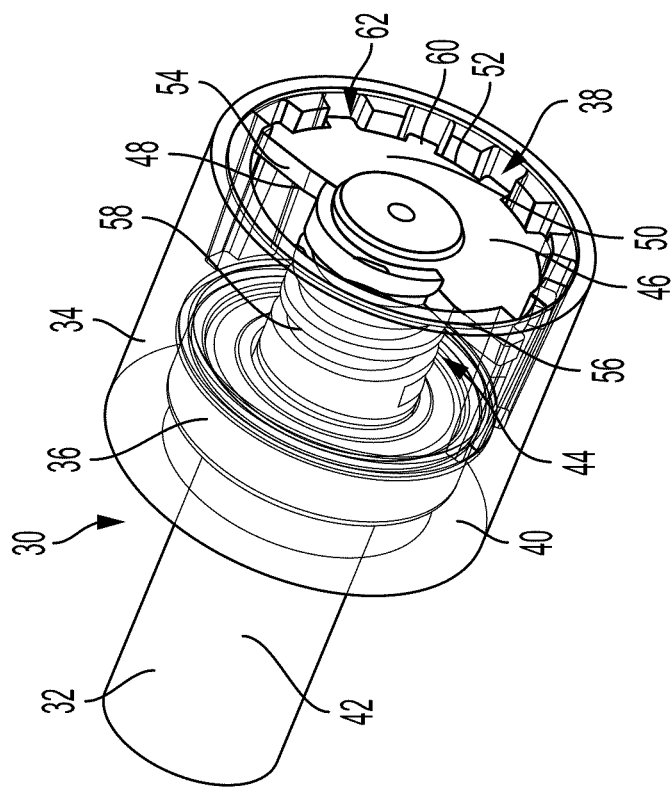
FIG. 5 is a perspective, partially transparent view of the rotational stop assembly in the assembled condition.
Figure 4:
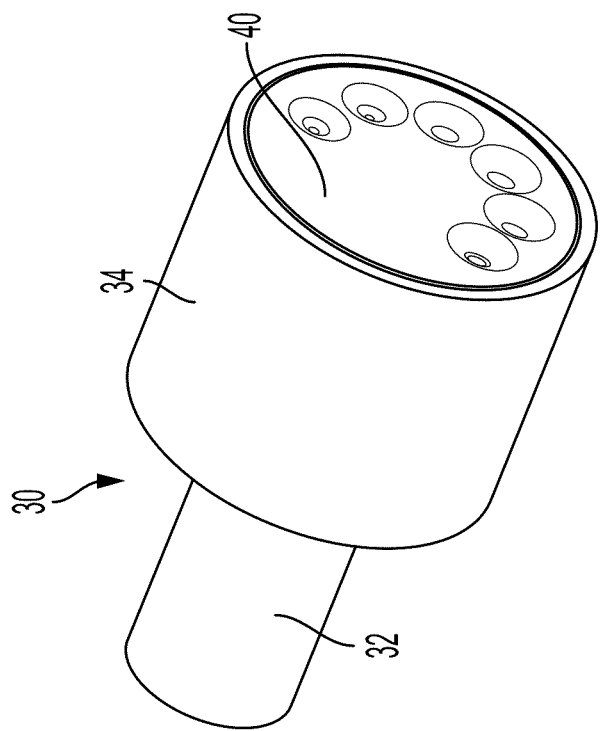
FIG. 4 is a perspective view of the rotational stop assembly in an assembled condition.

FIGS. 4 and 5 illustrate the travel stop assembly 30 in an assembled condition. FIG. 5 depicts the housing 34 transparently to illustrate the other components of the travel stop assembly 30 in their respective assembled positions. As shown, the shaft 32 includes a cylindrical portion 42 and a track portion 44. The bearing 36 is disposed between an outer surface of the cylindrical portion 42 of the shaft 32 and an inner surface of the housing 34 to assist with controlled rotation of the shaft 32 during operation.

Figure 6:
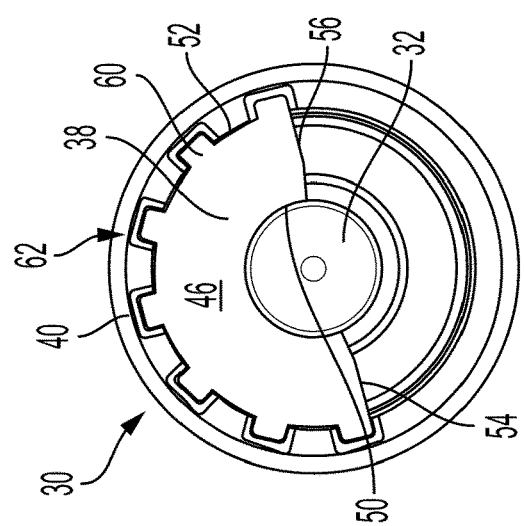
FIG. 6 is an end view of a portion of the rotational stop assembly.

Referring now to FIGS. 5 and 6, the nut 38 is a plate structure having a first side 46 and a second side 48 which define an axial thickness of the nut 38. The nut 38 extends radially from an inner radial surface 50 to an outer radial surface 52. The nut 38 extends circumferentially from a first end 54 to a second end 56. The angle between the first circumferential end 54 and the second circumferential end 56 may vary depending upon the particular application of use. In the illustrated example, the angle between the first circumferential end 54 and the second circumferential end 56 is approximately 180 degrees to define a semi-circular arc. However, it is to be appreciated that the specific angle between the first circumferential end 54 and the second circumferential end 56 may be different due to manufacturing tolerances and/or different customized angles used to achieve different travel stop angles, as described herein.

The inner radial surface 50 of the nut 38 is disposed within the spiral track 58 recessed within the track portion 44 of the shaft 32. The spiral track 58 may be formed by recesses defined by protruding segments extending radially outward from the shaft 32 or may be defined as a recessed portion within the track portion 44 of the shaft 32. The spiral track 58 extends helically along the shaft 32 over an axial sub-length of the shaft 32.

The outer radial surface 52 of the nut 38 includes a plurality of tabs 60 extending radially outward from the outer radial surface 52. The plurality of tabs 60 are circumferentially spaced from each other. The number of tabs, the circumferential spacing between the tabs, and the radial length of the tabs may vary depending upon the particular application of use. For example, in the illustrated embodiment, the plurality of tabs 60 include seven (7) tabs, but it is to be understood that this number of tabs is merely one example of the number of tabs which may be present. Each of the plurality of tabs 60 are at least partially seated within a respective one of a plurality of grooves 62 defined by the inner surface of the housing 34. The plurality of grooves 62 extend axially in a direction substantially parallel to the longitudinal axis A of the shaft 32.

The end cover 40 is operatively coupled to the housing 34 at an end thereof. As shown well in FIG. 3, the end cover 40 includes a plurality of protrusions 64 extending toward the nut 38 in the assembled condition. The plurality of protrusions 64 extend axially toward the nut 38, but not to a common axial extent. In particular, at least some of the plurality of protrusions 64 extend to a different axial length. The axial distance variation of the protrusions 64 defines an orientation of the nut 38 when the nut 38 is disposed at the end of the spiral track 58 closest to the end cover 40. Specifically, the plane of the nut 38 is not oriented perpendicularly relative to the longitudinal axis A of the shaft 32 due to the need for the nut 38 to be seated within the spiral track 58.

Figure 7:
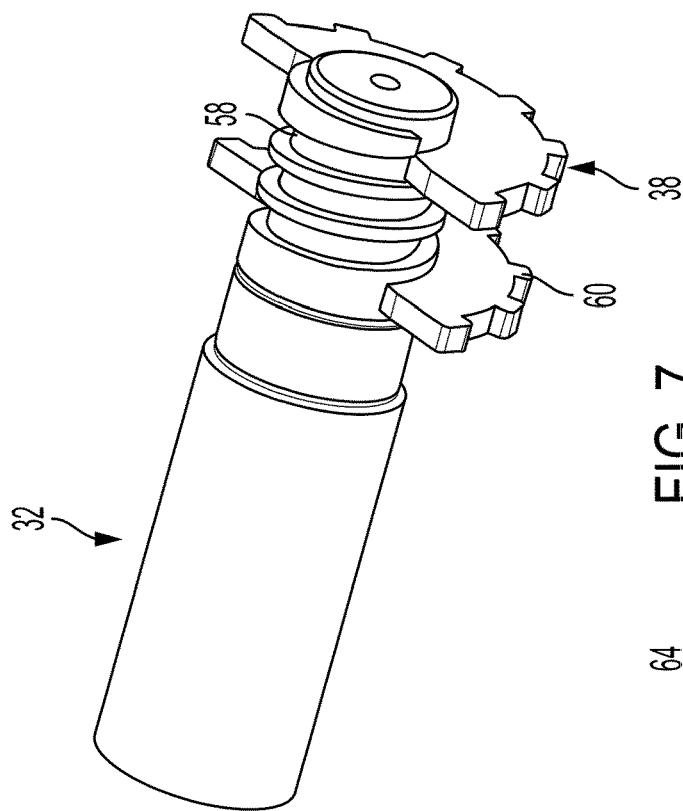
FIG. 7 is a perspective view of a portion of the rotational stop assembly illustrating two different axial positions of a nut of the rotational stop assembly.
Figure 8:
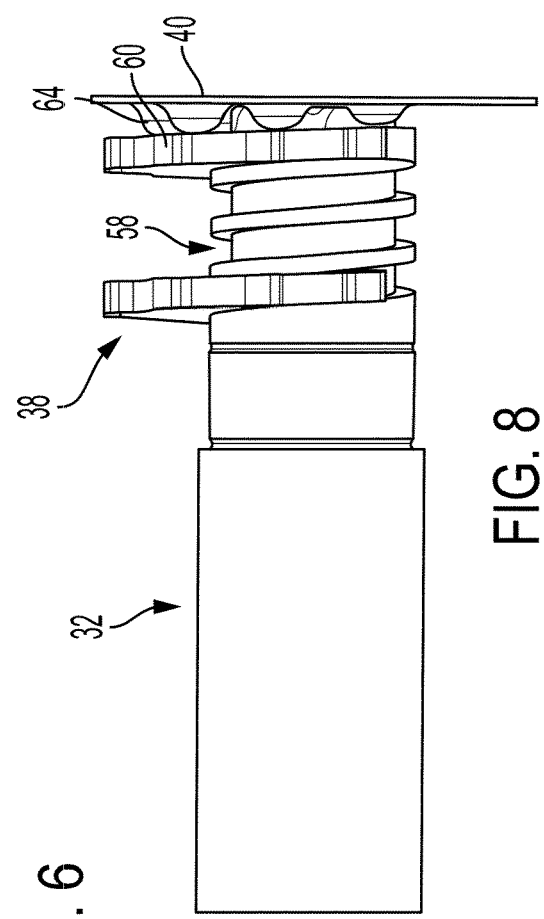
FIG. 8 is an elevation view of a portion of the rotational stop assembly illustrating two different axial positions of the nut of the rotational stop assembly.
Figure 10:
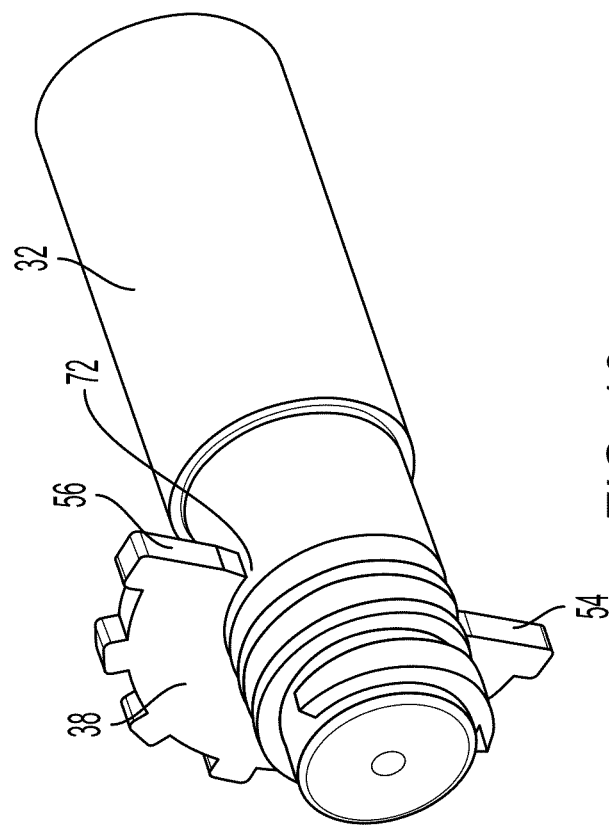
FIG. 10 is a perspective view of the nut at a second rotational stop position.
Figure 9:
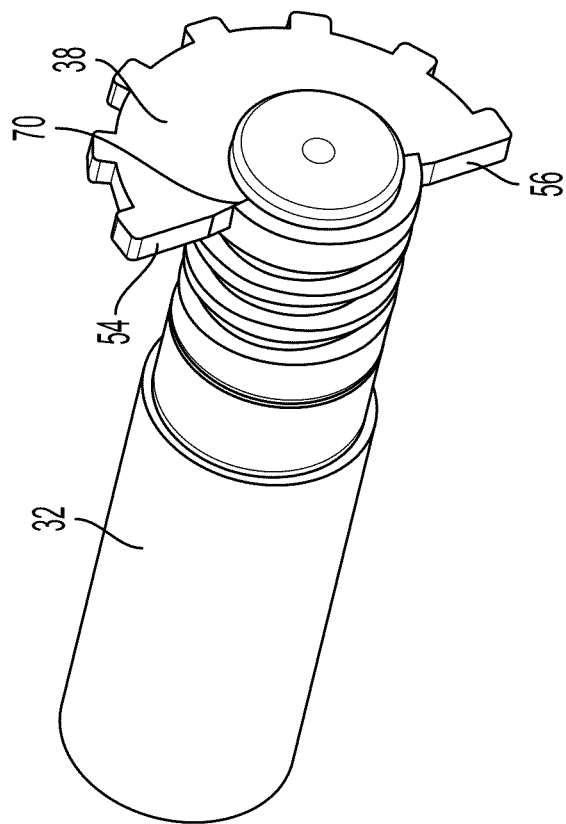
FIG. 9 is a perspective view of the nut at a first rotational stop position.

FIGS. 7 and 8 illustrate two different positions of the nut 38 within the spiral track 58. In operation, rotation of the shaft 32 corresponds to rotation of the steering shaft 16 and the handwheel 12. The nut 38 is rotationally constrained due to the plurality of tabs 60 being disposed within the grooves 62 of the housing 34 since the housing 34 is stationary relative to the shaft 32. The rotational constraint of the nut 38 results in axial travel of the nut 38 along the spiral track 58. The axial travel of the nut 38 is freely permitted along the entire length of the spiral track 58, such that rotation of the shaft 32 and, consequently, the steering shaft 16 and handwheel 12, is not impeded. However, after a predetermined rotation angle of the shaft 32 in a first direction, axial translation of the nut 38 causes one of the circumferential ends 54, 56 of the nut 38 to engage a first end 70 of the spiral track 58 to prevent further rotation of the shaft 32 in the first direction (FIG. 9). Rotation of the handwheel 12 is also stopped in the first direction at this position based on the structural connection of the shaft 32 with the steering shaft 16 and the handwheel 12. In the first axial position of the nut 38 defined by the end of the spiral track 58, rotation is permitted in an opposite direction, the second direction. However, after a predetermined rotation angle of the shaft 32 in the second direction, axial translation of the nut 38 causes one of the circumferential ends 54, 56 of the nut 38 to engage a second end 72 of the spiral track 58 to prevent further rotation of the shaft 32 in the second direction (FIG. 10). Rotation of the handwheel 12 is also stopped in the second direction at this position based on the structural connection of the shaft 32 with the steering shaft 16 and the handwheel 12.

Figure 12:
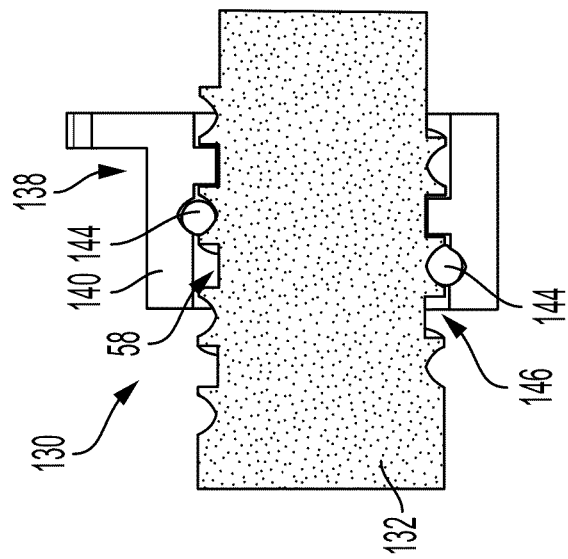
FIG. 12 is a cross-sectional view of the rotational stop assembly according to FIG. 11.
Figure 11:
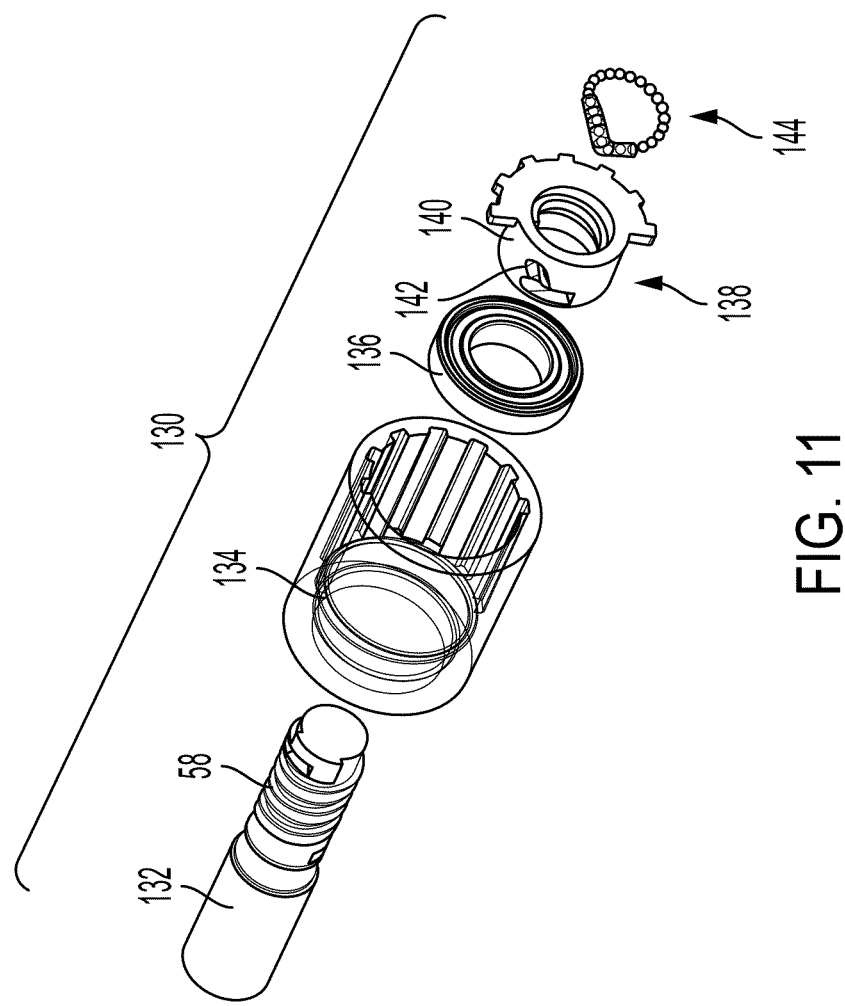
FIG. 11 is a perspective, disassembled view of the rotational stop assembly according to another aspect of the disclosure.

Referring now to FIGS. 11 and 12, a second embodiment of the travel stop assembly is shown in a disassembled condition and referred to generally with numeral 130. The travel stop assembly 130 includes a shaft 132, a housing 134, a bearing 136 and a nut 138. The shaft 132, the housing 134 and the bearing 136 are constructed similar or identical to the shaft 32, the housing 34 and the bearing 36 of the travel stop assembly 30 described in detail in connection with FIGS. 2-10. Therefore, the respective structure and functionality are not discussed in a duplicative manner here.

The nut 138 includes the same features as nut 38, but also includes an axially extending body portion 140 with a window 142 defined therein. The window 142 facilitates loading of a plurality of balls 144 for a recirculating ball assembly 146. The plurality of balls 144 are disposed within the spiral track 58 of the shaft 32 and retained by the axially extending portion 140 of the nut 138. The recirculating ball assembly 146 provides smooth axial relative movement between the nut 138 and the shaft 32.

Figure 16:
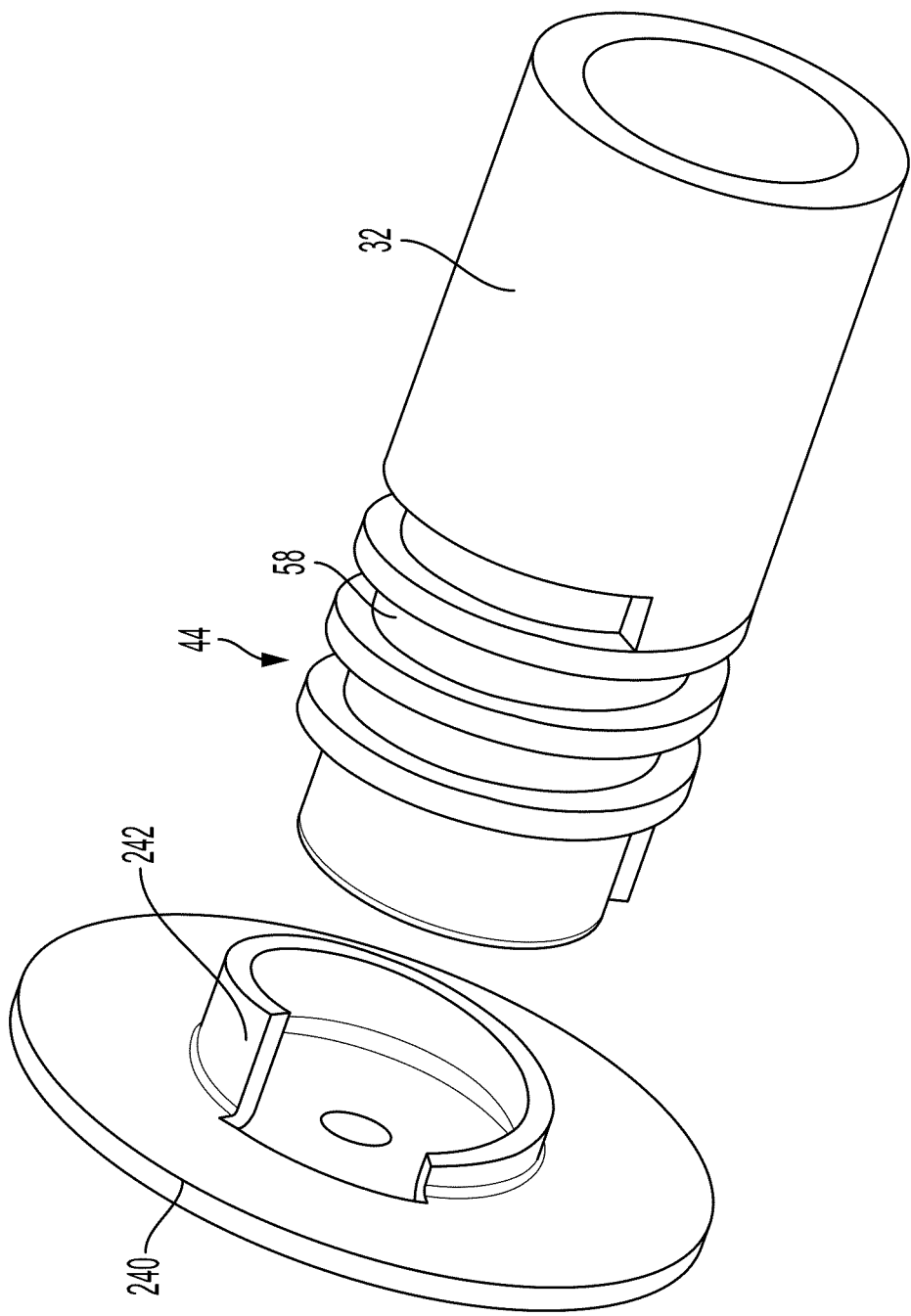
FIG. 16 is a perspective view of the rotational stop assembly according to another aspect of the disclosure.

Referring now to FIGS. 13-15, other embodiments of the travel stop assembly is shown and is referenced generally with numeral 200. The travel stop assembly 200 is shown with pins 202 which are inserted through holes 204 of the shaft 32 within the track portion 44. In such an embodiment, a plurality of tabs 206 extend radially inwardly away from an inner diameter 208 of the nut 38. This allows the tabs 206 to travel throughout the path of the spiral track 58 while the remainder of the nut 38 may be stamped flat. In the illustrated embodiments, the pins 202 are disposed within the shaft 32 to define both travel stop limitations, but it is contemplated that the shaft 32 itself may include integrally formed protrusions which define one or both ends of the travel stop limit. Furthermore, as shown in FIG. 16, an end cover 240 may include a protrusion or a spiral portion 242 which defines one end of the travel stop limit.

Figure 17:
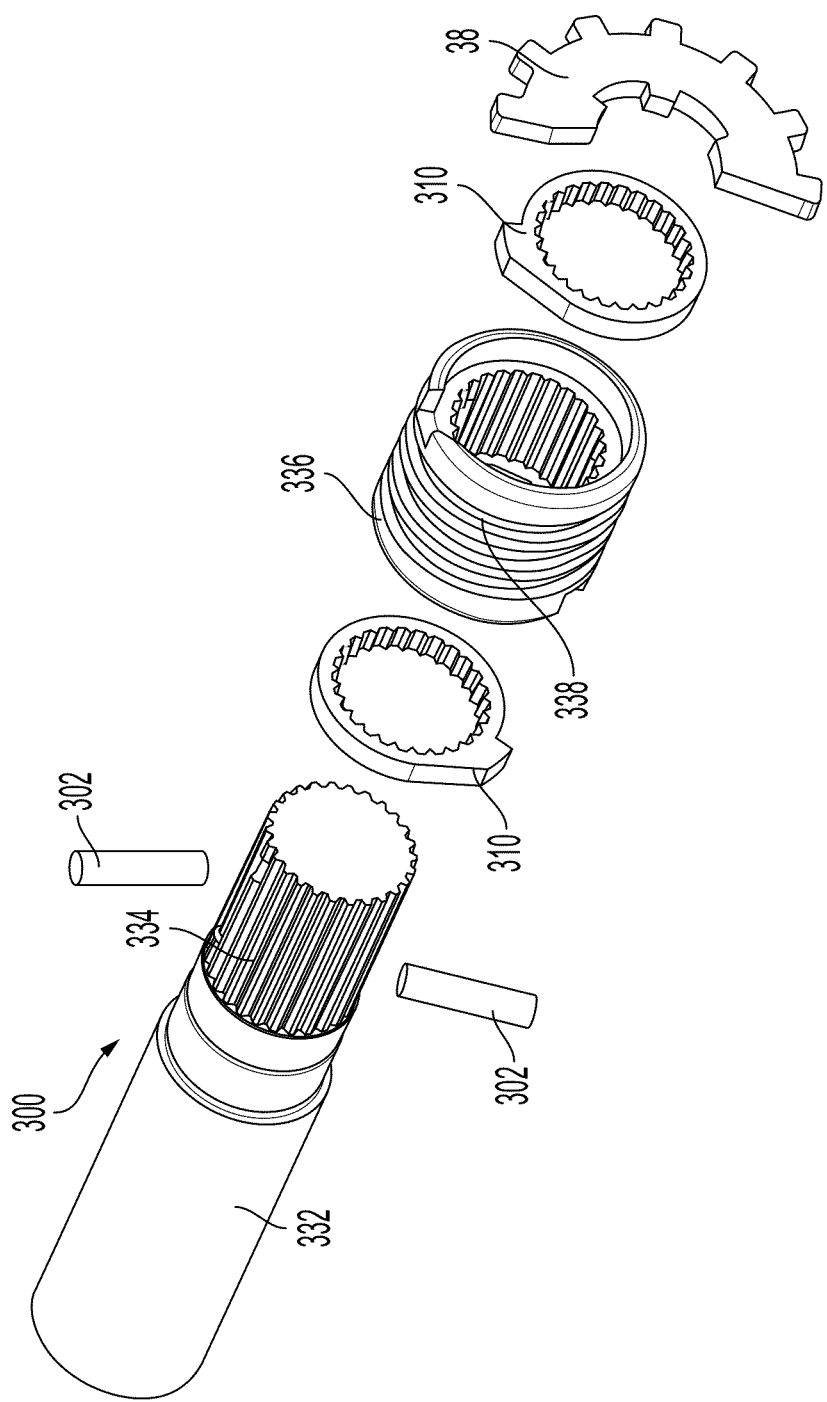
FIG. 17 is a perspective, disassembled view of the rotational stop assembly according to another aspect of the disclosure.

Referring now to FIG. 17, another embodiment of the travel stop assembly is shown and is referenced generally with numeral 300. The travel stop assembly 300 includes a shaft 332 with a splined region 334 which mates with a sleeve 336. The sleeve 336 may be formed of plastic in some embodiments and includes an inner diameter having splines for mating with the splined region 334 of the shaft 332. The outer surface of the sleeve 336 includes a spiral track 338 which the nut 38 travels within. As described above in connection with other embodiments, the nut 38 may include an inner diameter which travels within the spiral track 338 or may include offset tabs 306 which do so. The travel stop limits may be defined by pins 302 or retaining rings 310.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A travel stop assembly for a vehicle steer-by-wire steering system comprising:
   a shaft extending along an axis and being rotatable about the axis, the shaft defining a spiral track extending from a first track end to a second track end; and
   a nut extending radially from an inner radial surface to an outer radial surface, the nut extending circumferentially from a first circumferential end to a second circumferential end, wherein the inner radial surface is disposed within the spiral track, wherein the nut is rotationally fixed such that rotation of the shaft axially translates the nut along the spiral track, wherein the first track end, the second track end, the first circumferential end and the second circumferential end are positioned to limit the axial movement of the nut and rotation of the shaft to a predetermined axial distance of the nut and a predetermined rotational angle of the shaft, respectively, based on contact between the first circumferential end and the first track end, as well as contact between the second circumferential end and the second track end, wherein the angle between the first circumferential end and the second circumferential end is 180 degrees.

2. The travel stop assembly of claim 1, further comprising a housing radially surrounding the nut, wherein the outer radial surface of the nut includes a radially extending tab disposed within an axially extending groove defined by an inner surface of the housing to rotationally fix the nut.

3. The travel stop assembly of claim 2, wherein the radially extending tab is one of a plurality of tabs, wherein the axially extending groove is one of a plurality of grooves, wherein each of the tabs are disposed within one of the grooves.

4. The travel stop assembly of claim 2, further comprising an end cover operatively coupled to an end of the housing to axially retain the nut within the housing.

5. The travel stop assembly of claim 1, wherein the shaft includes a track portion and a cylindrical portion, wherein the nut is located on the track portion and a bearing is located on the cylindrical portion.

6. The travel stop assembly of claim 1, wherein the shaft is operatively coupled to a steering shaft.

7. The travel stop assembly of claim 1, wherein the shaft is integrally formed with a steering shaft.

8. A travel stop assembly for a vehicle steer-by-wire steering system comprising:
   a shaft extending along an axis and being rotatable about the axis, the shaft defining a spiral track extending from a first track end to a second track end;
   a nut extending radially from an inner radial surface to an outer radial surface, the nut extending circumferentially from a first circumferential end to a second circumferential end, wherein the inner radial surface is disposed within the spiral track, wherein the nut is rotationally fixed such that rotation of the shaft axially translates the nut along the spiral track, wherein the first track end, the second track end, the first circumferential end and the second circumferential end are positioned to limit the axial movement of the nut and rotation of the shaft to a predetermined axial distance of the nut and a predetermined rotational angle of the shaft, respectively, based on contact between the first circumferential end and the first track end, as well as contact between the second circumferential end and the second track end;
   a housing radially surrounding the nut, wherein the outer radial surface of the nut includes a radially extending tab disposed within an axially extending groove defined by the inner surface of the housing to rotationally fix the nut; and
   an end cover operatively coupled to an end of the housing to axially retain the nut within the housing, wherein the end cover includes a plurality of protrusions positioned to contact the nut when the nut is located at one of the first track end and the second track end, wherein at least two of the plurality of protrusions axially extend to different lengths to orient the nut in a desired position within the spiral track of the shaft.

9. A steer-by-wire vehicle steering system comprising:
   a steering shaft configured to be rotated during steering maneuvers of a vehicle;
   a handwheel actuator operatively coupled to the steering shaft; and
   a shaft operatively coupled to the steering shaft or integrally formed with the steering shaft, the shaft limited to a predetermined rotational angle with a travel stop assembly comprising:
      a spiral track defined along an axial portion of the shaft, the spiral track extending from a first track end to a second track end;
      a nut extending radially from an inner radial surface to an outer radial surface, the nut extending circumferentially from a first circumferential end to a second circumferential end, wherein the inner radial surface is disposed within the spiral track; and
      a housing radially surrounding the nut, wherein the outer radial surface of the nut includes a radially extending tab disposed within an axially extending groove defined by an inner surface of the housing to rotationally fix the nut,
      wherein the nut is rotationally fixed such that rotation of the shaft axially translates the nut along the spiral track, wherein the first track end, the second track end, the first circumferential end and the second circumferential end are positioned to limit the axial movement of the nut and rotation of the shaft to a predetermined axial distance of the nut and a predetermined rotational angle of the shaft, respectively, based on contact between the first circumferential end and the first track end, as well as contact between the second circumferential end and the second track end; and
      an end cover operatively coupled to an end of the housing to axially retain the nut within the housing, wherein the end cover includes a plurality of protrusions positioned to contact the nut when the nut is located at one of the first track end and the second track end, wherein at least two of the plurality of protrusions axially extend to different lengths to orient the nut in a desired position within the spiral track of the shaft.

10. The vehicle steering system of claim 9, wherein the radially extending tab is one of a plurality of tabs, wherein the axially extending groove is one of a plurality of grooves, wherein each of the tabs are disposed within one of the grooves.

11. The vehicle steering system of claim 9, wherein the angle between the first circumferential end and the second circumferential end is 180 degrees.

12. The vehicle steering system of claim 9, wherein the shaft includes a track portion and a cylindrical portion, wherein the nut is located on the track portion and a bearing is located on the cylindrical portion.

13. A travel stop assembly for a steer-by-wire vehicle steering system comprising:
   a shaft extending along an axis and being rotatable about the axis, the shaft defining a spiral track extending from a first track end to a second track end;
   a nut extending radially from an inner radial surface to an outer radial surface, the nut extending circumferentially from a first circumferential end to a second circumferential end, wherein the inner radial surface is disposed within the spiral track;
   a housing radially surrounding the nut, wherein the outer radial surface of the nut includes a radially extending tab disposed within an axially extending groove defined by an inner surface of the housing to rotationally fix the nut, wherein the nut is rotationally fixed such that rotation of the shaft axially translates the nut along the spiral track, wherein the first track end, the second track end, the first circumferential end and the second circumferential end are positioned to limit the axial movement of the nut and rotation of the shaft to a predetermined axial distance of the nut and a predetermined rotational angle of the shaft, respectively, based on contact between the first circumferential end and the first track end, as well as contact between the second circumferential end and the second track end; and a recirculating ball circuit disposed between the nut and the spiral track.

14. The vehicle steering system of claim 13, wherein the radially extending tab is one of a plurality of tabs, wherein the axially extending groove is one of a plurality of grooves, wherein each of the tabs are disposed within one of the grooves.

\* \* \* \* \*